(12) United States Patent
Finkelstein

(10) Patent No.: US 10,778,415 B2
(45) Date of Patent: Sep. 15, 2020

(54) SYSTEMS AND METHODS FOR DISABLING PHYSICAL MODULES IN NETWORK SWITCHES USING ENCRYPTION

(71) Applicant: COX COMMUNICATIONS, INC., Atlanta, GA (US)

(72) Inventor: Jeffrey L. Finkelstein, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 291 days.

(21) Appl. No.: 15/875,837

(22) Filed: Jan. 19, 2018

(65) Prior Publication Data
US 2019/0229895 A1 Jul. 25, 2019

(51) Int. Cl.
| | | |
|---|---|---|
| H04L 9/08 | (2006.01) | |
| H04L 12/24 | (2006.01) | |
| H04B 10/40 | (2013.01) | |
| H04L 9/32 | (2006.01) | |
| H04L 29/06 | (2006.01) | |
| H04L 12/931 | (2013.01) | |

(52) U.S. Cl.
CPC .............. *H04L 9/08* (2013.01); *H04B 10/40* (2013.01); *H04L 9/3213* (2013.01); *H04L 41/0803* (2013.01); *H04L 49/351* (2013.01); *H04L 63/0428* (2013.01)

(58) Field of Classification Search
CPC ..... H04L 9/08; H04L 49/351; H04L 63/0428; H04L 9/3213; H04L 41/0803; H04L 9/3234; H04L 9/083; H04L 9/321; H04B 10/40
See application file for complete search history.

(56) References Cited

U.S. PATENT DOCUMENTS

| | | | |
|---|---|---|---|
| 8,793,774 B1 * | 7/2014 | Kumar | H04L 63/20 726/3 |
| 10,333,903 B1 * | 6/2019 | Campagna | H04L 63/061 |
| 2013/0080769 A1 * | 3/2013 | Cha | H04L 63/168 713/155 |
| 2013/0318343 A1 * | 11/2013 | Bjarnason | H04L 41/0809 713/157 |

(Continued)

*Primary Examiner* — Huan V Doan
(74) *Attorney, Agent, or Firm* — Eversheds Sutherland (US) LLP

(57) ABSTRACT

In various embodiments, the disclosed systems, methods, and apparatuses describe the use of encryption mechanisms (for example, a Kerberos encryption mechanism) to prevent the theft of a device, such as, a network switch (for example, an Ethernet switch) and/or any physical modules (such as, pluggable optics modules) stored therein. In one embodiment, one or more keys can be centralized in the device such as a network device or can be decentralized at a head-end, or stored higher in various layers of the network. In an embodiment, a lack of matching of the various keys associated with the network switch and/or the physical modules and/or packets encrypted and/or decrypted with the keys to one another upon a test, can render the devices such as a network device inoperable and/or may render one or more pluggable optics, a group of such pluggable optics or an entire PCB board or switch comprising one or more pluggable optics and/or physical modules inoperable.

18 Claims, 6 Drawing Sheets

(56) References Cited

U.S. PATENT DOCUMENTS

2014/0317409 A1\* 10/2014 Bartok ............... H04L 63/0823
                                                    713/171
2017/0230245 A1\* 8/2017 Jacquin .................. H04L 41/28
2018/0167393 A1\* 6/2018 Walrant ............... H04L 9/0891

\* cited by examiner

_(12) United States Patent — US 10,778,415 B2_

SYSTEMS AND METHODS FOR DISABLING PHYSICAL MODULES IN NETWORK SWITCHES USING ENCRYPTION

BACKGROUND

Network devices (such as gateways, routers, and/or switches) can enable the transmission of data and information within between devices over a network. Network devices may be installed and/or deployed in a variety of situations and locations, including homes, buildings, and outdoor and/or public locations such as street sides or railway lines. Network devices deployed in unsecure locations may be exposed to increased risks of theft. Theft of such devices may incur costs and inconveniences for network administrators that manage such devices and networks.

BRIEF DESCRIPTION OF THE DRAWINGS

Reference will now be made to the accompanying drawings, which may not necessarily be drawn to scale, and wherein.

DETAILED DESCRIPTION OF VARIOUS EMBODIMENTS

Figure 1:
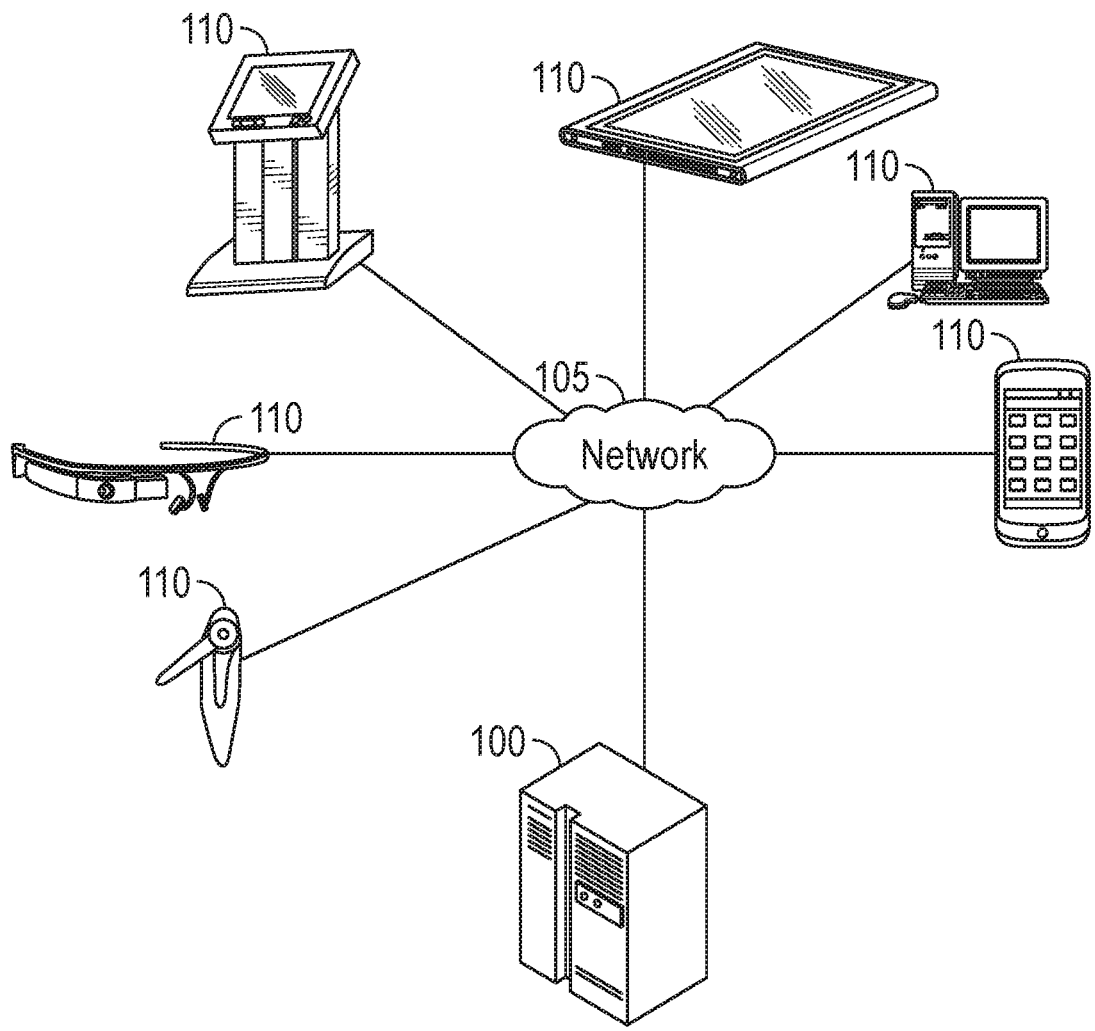
FIG. 1 is an overview of a system that can be used to practice embodiments of the present disclosure.

This specification relates to system and method for the use of encryption mechanisms (for example, a Kerberos encryption mechanism) to prevent the theft of a device such as a network switch (for example, an Ethernet switch) and/or any physical modules (such as pluggable optics modules) stored therein. In one embodiment, one or more keys can be centralized in the device such as a network device, or can be decentralized at a head-end, or stored in one or more devices that are higher in the functional layers of the network. In an embodiment, a lack of matching of the various keys associated with the network switch and/or the physical modules and/or packets encrypted and/or decrypted with the keys to one another upon a test can render the devices such as a network device inoperable and/or may render one or more pluggable optics, a group of such pluggable optics or an entire PCB board or switch comprising one or more pluggable optics and/or physical modules inoperable.

In an embodiment, the systems, methods, and apparatus described herein can be used in securing devices and/or pluggable modules using a transmission between a non-trusted device (such as a given pluggable module) and a trusted device (for example, a switch containing the non-trusted devices including pluggable modules) by authenticating the non-trusted device using a variety of methods including, but not limited to, public key encryption, private authentication, and/or encrypted secret key. In another embodiment, when removed, the non-trusted device will no longer function until cleared (for example, using authentication methods described herein) by a central and secured device serving as a clearing house in the service provider network.

Other embodiments of this aspect include corresponding systems, apparatus, and computer programs, configured to perform the actions of the methods, encoded on computer storage devices.

These and other embodiments can each optionally include one or more of the following features. Controlling and monitoring, by one or more processors of third devices in communication with the processors of the one or more second devices, routing functions associated with the network. Demodulating signals and providing data associated with the demodulated signals, by the processors of the first one or more devices, to the one or more second devices.

Other embodiments of this aspect include corresponding systems, apparatus, and computer programs, configured to perform the actions of the methods, encoded on computer storage devices.

Particular embodiments of the subject matter described herein can be implemented so as to realize one or more of the following advantages. Improve network stability and operational data transfer rates and, in turn, improve the user experience. Reduce the costs associated with routing network traffic, network maintenance, network upgrades, and/or the like. Embodiments of the claimed subject matter also allows for flexible placement of devices incorporating different functionality associated with an OSI model. For example, a device incorporating functionality of layer 1 may be placed a distance from a device incorporating functionality of layer 2, and each may be upgraded independently.

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

I. Computer Program Products, Methods, and Computing Entities

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (Fe-RAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Example System Architecture

FIG. 1 provides an illustration of an example embodiment of the present disclosure. As shown in FIG. 1, this particular embodiment may include one or more management computing entities 100, one or more networks 105, and one or more user devices 110. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Example Management Computing Entity

Figure 2:
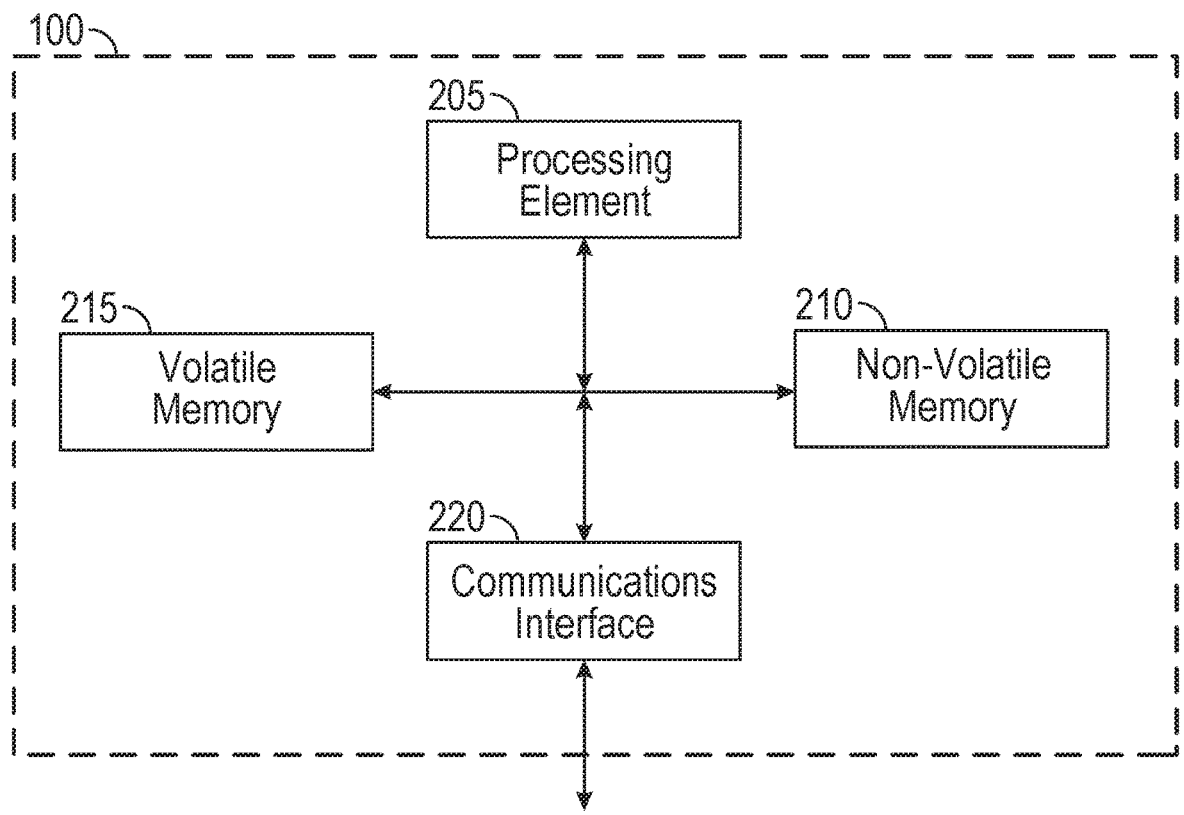
FIG. 2 is an example schematic diagram of a management computing entity, in accordance with example embodiments of the disclosure.

FIG. 2 provides a schematic of a management computing entity 100 according to one embodiment of the present disclosure. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (for example Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. For instance, the management computing entity 100 may communicate with user devices 110 and/or a variety of other computing entities.

As shown in FIG. 2, in one embodiment, the management computing entity 100 may include or be in communication with one or more processing elements 205 (also referred to as processors, processing circuitry, and/or similar terms used herein interchangeably) that communicate with other elements within the management computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the management computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 100 with the assistance of the processing element 205 and operating system.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOC SIS), or any other wired transmission protocol. Similarly, the management computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the management computing entity 100 may include or be in communication with one or more input elements, such as a keyboard input, a mouse input, a touch screen/display input, motion input, movement input, audio input, pointing device input, joystick input, keypad input, and/or the like. The management computing entity 100 may also include or be in communication with one or more output elements (not shown), such as audio output, video output, screen/display output, motion output, movement output, and/or the like.

As will be appreciated, one or more of the management computing entity's 100 components may be located remotely from other management computing entity 100 components, such as in a distributed system. Furthermore, one or more of the components may be combined and additional components performing functions described herein may be included in the management computing entity 100. Thus, the management computing entity 100 can be adapted to accommodate a variety of needs and circumstances. As will be recognized, these architectures and descriptions are provided for example purposes only and are not limiting to the various embodiments.

2. Example User device

Figure 3:
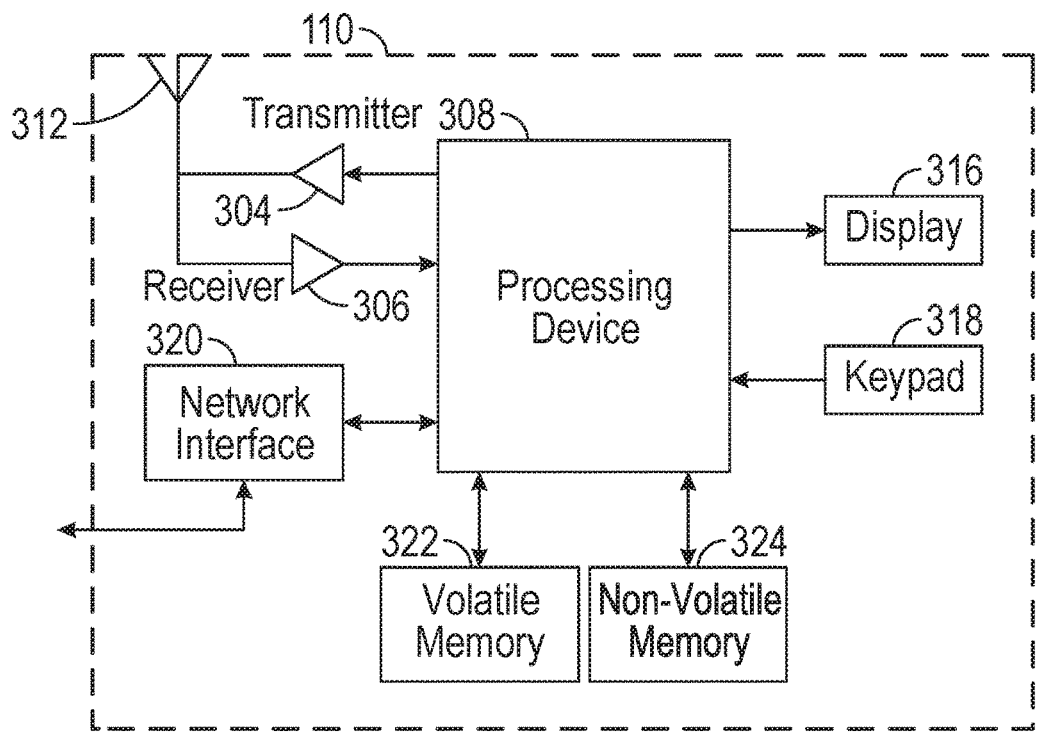
FIG. 3 is an example schematic diagram of a user device, in accordance with example embodiments of the disclosure.

A user may be an individual, a family, a company, an organization, an entity, a department within an organization, a representative of an organization and/or person, and/or the like. In one example, users may be employees, residents, customers, and/or the like. For instance, a user may operate a user device 110 that includes one or more components that are functionally similar to those of the management computing entity 100. FIG. 3 provides an illustrative schematic representative of a user device 110 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (for example Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User devices 110 can be operated by various parties. As shown in FIG. 3, the user device 110 can include an antenna 312, a transmitter 304 (for example radio), a receiver 306 (for example radio), and a processing element 308 (for example CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user device 110 may be capable of operating with one or more air interface standards, communication protocols, modulation types, and access types. More particularly, the user device 110 may operate in accordance with any of a number of wireless communication standards and protocols, such as those described above with regard to the management computing entity 100. In a particular embodiment, the user device 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user device 110 may operate in accordance with multiple wired communication standards and protocols, such as those described above with regard to the management computing entity 100 via a network interface 320.

Via these communication standards and protocols, the user device 110 can communicate with various other entities using concepts such as Unstructured Supplementary Service Data (US SD), Short Message Service (SMS), Multimedia Messaging Service (MMS), Dual-Tone Multi-Frequency Signaling (DTMF), and/or Subscriber Identity Module Dialer (SIM dialer). The user device 110 can also download changes, add-ons, and updates, for instance, to its firmware, software (for example including executable instructions, applications, program modules), and operating system.

According to one embodiment, the user device 110 may include location determining aspects, devices, modules, functionalities, and/or similar words used herein interchangeably. For example, the user device 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user device's 110 position in connection with a variety of other systems, including cellular towers, Wi-Fi access points, and/or the like. Similarly, the user device 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (for example smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user device 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user device 110 to interact with and/or cause display of information from the management computing entity 100, as described herein. The user input interface can comprise any of a number of devices or interfaces allowing the user device 110 to receive data, such as a keypad 318 (hard or soft), a touch display, voice/speech or motion interfaces, or other input devices. In embodiments including a keypad 318, the keypad 318 can include (or cause display of) the conventional numeric (0-9) and related keys (#,*), and other keys used for operating the user device 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user device 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user device 110. As indicated, this may include a user application that is resident on the entity or accessible through a browser or other user interface for communicating with the management computing entity 100 and/or various other computing entities.

In another embodiment, the user device 110 may include one or more components or functionality that are the same or similar to those of the management computing entity 100, as described in greater detail above. As will be recognized, these architectures and descriptions are provided for example purposes only and are not limiting to the various embodiments.

III. Example System Operation

Figure 4:
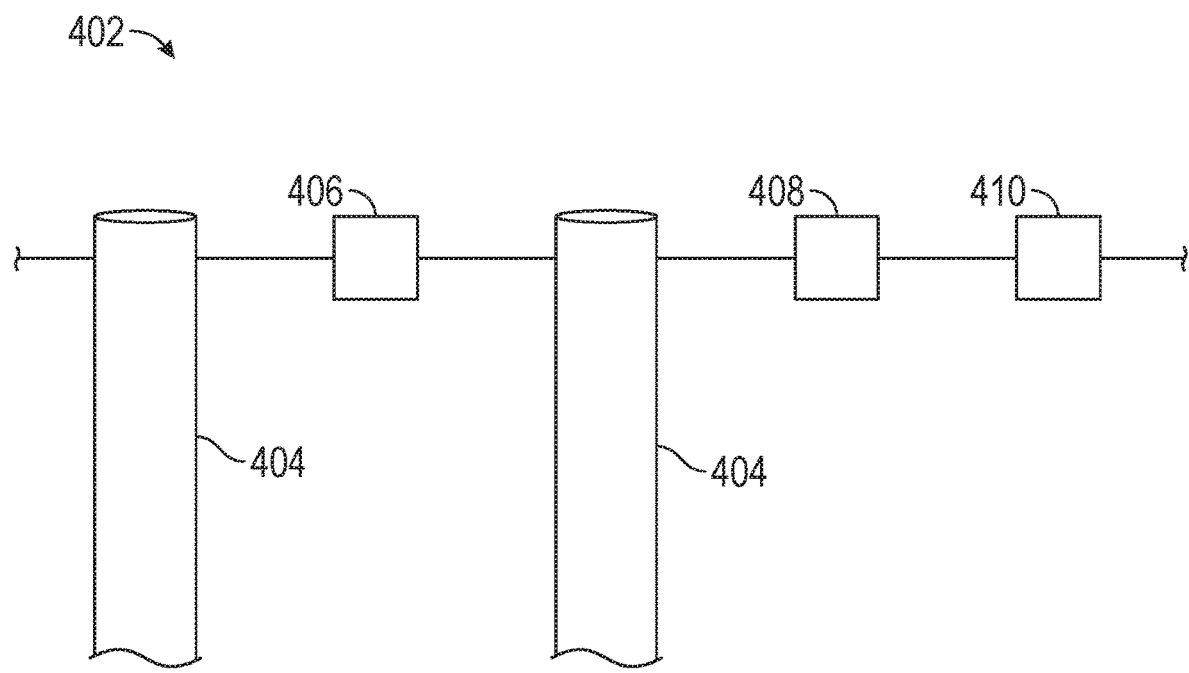
FIG. 4 shows an example schematic diagram of a portion of a cable network and associated devices, in accordance with example embodiments of the disclosure.

FIG. 4 shows a diagram 402 of an example portion of an environment used in association with a cable network, in accordance with one or more example embodiments of the disclosure. In one embodiment, diagram 402 can show one or more poles 404, for example, one or more network utility poles. In one embodiment, the poles 404 can be connected to one another using one or more wires and/or cables 404b. In one embodiment, the poles 404 can be made of any suitable material such as wood, steel and the like. In one embodiment, the poles 404 can be located geographically in a rural and/or city environment. In one embodiment, the poles 404 can be used to support network traffic of various types, for example, cable traffic, Wi-Fi traffic and/or internet traffic. In one embodiment, a portion of the poles 404 and/or a portion of the wires 404b and/or cables can be located at least partially underground, for example, to provide protection from the elements. In one embodiment, the poles 404 can be spaced apart at a predetermined distance, for example, approximately 100 meters. In another embodiment, the poles may be spaced apart in one geographical location at one distance and at another geographic location at a second distance.

In an embodiment, the pole 404 can refer to a column or post used to support overhead power lines and various other public utilities, such as electrical cable, fibre optic cable, and related equipment such as transformers and street lights. In another embodiment, the pole 404 can include a transmission pole, telephone pole, telecommunication pole, power pole, hydro pole, telegraph pole, and/or telegraph post.

In an embodiment, the poles 404 can be made of wood, metal, concrete, or composites like fiberglass. In an embodiment, the poles 404 can be used for different types of power lines; subtransmission lines that can carry higher voltage power, and distribution lines that can distribute lower voltage power to customers.

In an embodiment, the poles 404 can have a dimensions including approximately being 40 ft (12 m) long, and can be buried approximately 6 ft (2 m) in the ground. In another embodiment, the poles 404 can have heights of 120 ft (37 m) or more, for example, to satisfy clearance requirements. In an embodiment, the poles 404 can be spaced approximately 125 ft (38 m) apart from one another, for example, in urban areas. In another embodiment, the poles can be spaced approximately 300 ft (91 m) in rural areas. In an embodiment, the poles 404 can carry electric power distribution lines and associated equipment mounted at the top of the pole above the communication cables such as shown by wires 404b. In an embodiment, a vertical space on the pole 404 can be reserved for equipment and can be referred to as supply space. In an embodiment, the wires 404b including communications cables can be attached below electric power lines, for example, in a vertical space along the pole 404, which can be referred to as a communications space. In an embodiment, the wires 404b can include communication cables comprising copper or fibre optic cable (FOC) for telephone lines and coaxial cable for cable television (CATV). In an embodiment, the wires 404b including communication cables can connect to service drops (not shown), for example, to provide local service to customers.

In an embodiment, diagram 402 further shows example devices 406, 408 and/or 410 that can be located proximate to the one or more poles 404, for example, attached to the poles 404 (not shown) and/or attached to one or more cables and/or fibers 404b that are associated with the one or more poles. In one embodiment, the devices 406, 408 and/or 410 can include various network node devices, for example, network node devices such as remote physical (PHY) devices, remote medium access control (MAC) devices and/or remote hybrid PHY/MAC devices. In an embodiment, devices 406, 408, and/or 410 can encompass aspects of the functionality of the management computing entity 100, described above. In one embodiment, one or more of the devices 406, 408 and/or 410 can include a switch, for example, a network switch such as an Ethernet switch. In one embodiment, components of the switch may be included in one chassis associated with one of the one or more devices 406, 408 and/or 410 or may be distributed across multiple devices, for example, two or more of the shown devices 406, 408 and/or 410. In an embodiment, there may be several° devices included inside any given device of the devices 406, 408 and/or 410. Further, the devices such devices 406, 408 and/or 410 can be positioned on the line and/or on the pole at a predetermined distance. In one embodiment, the one or more devices 406, 408 and/or 410 can be locked with a security apparatus on at least a portion of the devices 406, 408 and/or 410. In one embodiment, a power line, for example, a power line associated with a pole 404 may be used to power one or more of the devices 406, 408 and/or 410. In another embodiment, the devices 406, 408 and/or 410 may further include their own onboard power capability, for example, by using a battery. In one embodiment, one or more of the devices 406, 408 and/or 410 can include one or more antennas for wireless communication.

In one embodiment, the devices 406, 408 and/or 410 can include an Ethernet switch comprising one or more physical devices, which can additionally be referred to herein as a physical module. In an embodiment, the physical module and/or physical device can include optical devices, such as pluggable optics modules. In one embodiment, such an Ethernet switch can include 10 gigabit Ethernet and/or 100 gigabit Ethernet functionality, that is, network transmissions on the order of 10 gigabytes per second and/or 100 gigabytes per second, for example, using the one or more constituent optical devices. In an embodiment, 10 gigabit Ethernet (also referred to as 10 GE, 10 GbE, or 10 GigE herein), as used in connection with the disclosure herein, can refer to a networking technologies for transmitting Ethernet frames at a rate of 10 gigabits per second. In an embodiment, 10 Gigabit Ethernet can be defined at least in part by the IEEE 802.3 ae-2002 standard. In an embodiment, 10 Gigabit Ethernet may define full duplex point-to-point links which are generally connected by network switches.

In one embodiment, such an Ethernet switch can have a number of physical modules (for example, optical modules) per switch, for example, one such switch may include approximately 24 physical modules (for example, optical modules) for supporting 10 gigabit per second Ethernet. In another embodiment, such a switch can include approximately two physical modules (for example, optical modules) for supporting 100 gigabit per second optical networks. In one embodiment, an Ethernet switch such as described herein can include the functionality to take a waveform representative of a signal on the network, having a predetermined wavelength and/or frequency, and modulate that waveform for further transmission along the network.

In an embodiment, to implement different 10 GbE physical layer standards, some interfaces can include standard socket into which different PHY modules may be plugged. Physical layer modules may be described by multi-source agreements (MSAs). MSAs for 10 GbE can include XENPAK (and related X2 and XPAK), 10 Gigabit small form factor pluggable (XFP) and small form factor pluggable (SFP) and/or small form factor pluggable plus (SFP+). A given PHY module can be determined to be used by a designer based on cost, reach, media type, power consumption, and/or size (form factor). In an embodiment, the PHY modules can be connected to a host by various interfaces, for example, X attachment unit interface (XAUI), 10 gigabit small form factor interface (XFI) or SFI interface.

Figure 5:
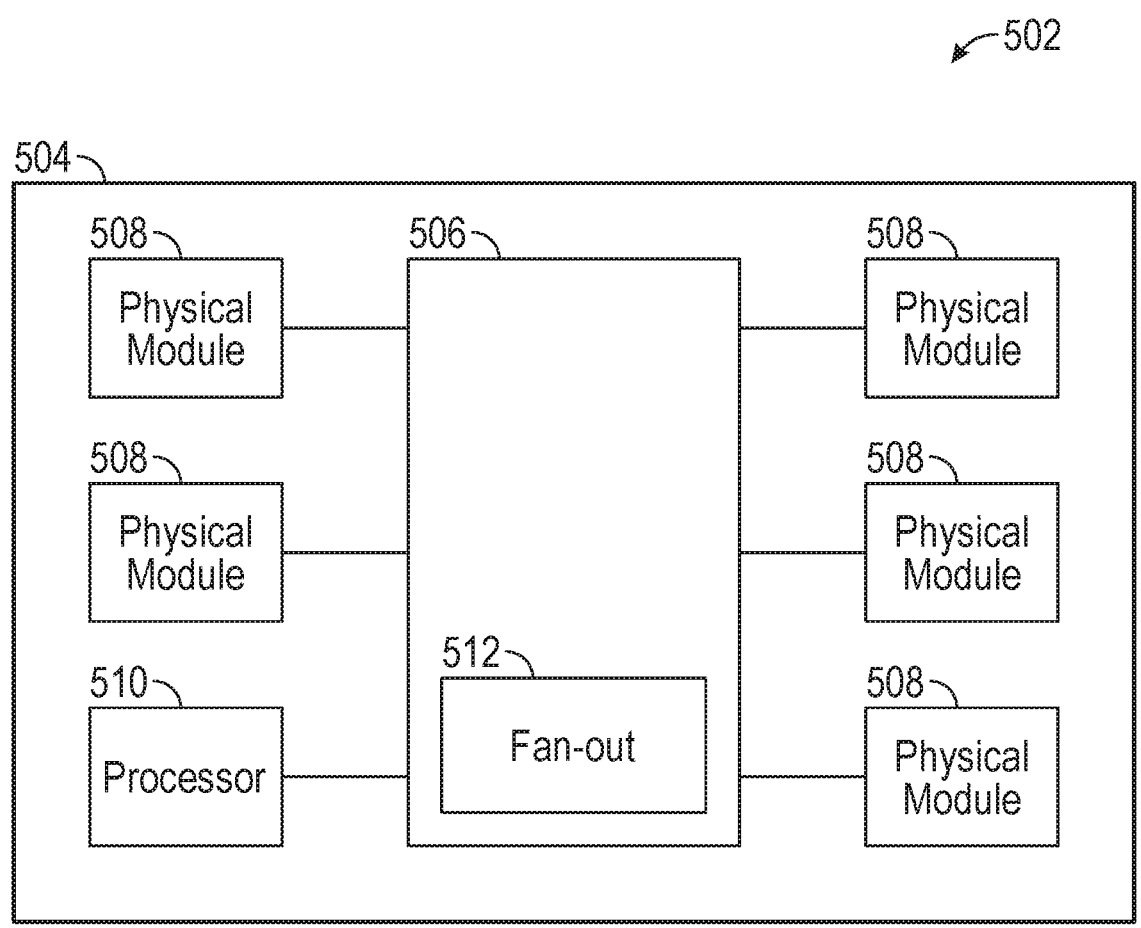
FIG. 5 shows an example schematic diagram of an example network device for use in association with the systems and methods described herein, in accordance with one or more example embodiments of the disclosure.

FIG. 5 shows a diagram 502 of an example network device for use in association with the systems and methods described herein, in accordance with one or more example embodiments of the disclosure. In one embodiment, the device 504 can include a switch, such as a network switch, for example, an Ethernet switch. In one embodiment, the device 504 can include a portion of another device such as a remote PHY device, a remote MAC device and/or a remote hybrid MAC/PHY device. In another embodiment, the device may provide its own standalone switching functionality. In one embodiment, the device 504 may be protected by a lock, and/or be secured using any other mechanism, electronic or otherwise.

In an embodiment, the device 504 can include a board such as a PCB board 506. In an embodiment, the PCB board 506 can include various devices including, but not limited to, resistors, memory processors, power connections, antennas, input ports and the like. In one embodiment, the PCB board 506 may be one of a number of PCB boards in the device 504. In one embodiment, the PCB board 506 may include or may be otherwise electrically connected to a number of other devices such as physical modules 508, which may be pluggable into the PCB board 506 of the device 504.

In one embodiment, the physical modules 508 can include optical modules. In another embodiment, the physical modules 508 can include hot-pluggable modules. In one embodiment, the PCB board 506 can be connected to and/or include a predetermined number of such physical modules 508. In another embodiment, there may be a variety of different types of pluggable modules 508, for example, some pluggable modules 508 that are optics modules and others that are electrical modules. In one embodiment, the physical modules 508 can have a predetermined footprint such as, for example, an small form factor (SFP) footprint or another type of footprint, as described herein.

In an embodiment, the SFP module can refer to a compact, hot-pluggable optical module transceiver used in communications networks. In an embodiment, as used herein, SFP modules can refer to both the SFP modules and the SFP+ modules. In an embodiment, SFP sockets can be found in Ethernet switches, routers, firewalls, and/or network interface cards, and the like. In an embodiment, storage interface cards and/or fiber channel storage switches, also make use of these modules, supporting different speeds such as 2 Gb, 4 Gb, and 8 Gb.

In an embodiment, the form factor of an SFP module can include a height of approximately 8.5 mm, a width of approximately 13.4 mm, and/or a depth of approximately 56.5 mm. In another embodiment, the form factor of an XFP module can include a height of approximately 8.5 mm, a width of approximately 18.35 mm, and/or a depth of approximately 78 mm. In an embodiment, SFP modules can support synchronous optical networking (SONET), gigabit Ethernet, fiber channel, and other communications standards.

In an embodiment, SFP modules are available with a variety of transmitter and receiver types, allowing users to select the appropriate transceiver for each link to provide the required optical reach over the available optical fiber type (e.g. multi-mode fiber or single-mode fiber).

In an embodiment, the quad small form-factor pluggable (QSFP) can refer to a compact, hot-pluggable transceiver used for data communications applications. In an embodiment, the form factor and electrical interface are specified by a multi-source agreement (MSA) under the auspices of the Small Form Factor Committee. It interfaces networking hardware (such as servers and switches) to a fiber optic cable or active or passive electrical copper connection. In an embodiment, QSFP can be used in connection with 100 Gbit/s links. In an embodiment, QSFP transceivers are available with a variety of transmitter and receiver types, allowing users to select the appropriate transceiver for each link to provide the required optical reach over multi-mode or single-mode fiber.

In one embodiment, the physical modules 508 can have onboard memory including the capability of the memory to include one or more keys, such as public and/or private encryption keys. In one embodiment, the PCB board 506 can either house or be electrically connected to at least one processor 510. In one embodiment, the processor 510 can further include memory and/or be connected to external memory. In one embodiment, the processor 510 can be used to provide supervisory control over the various physical modules 508 in the device 504. In another embodiment, the processor 510 can include one or more keys such as public and/or private encryption keys associated with the device itself 504 and/or the one or more physical modules 508. In one embodiment, the device 504 can further include a fan-out 512 to various types of optics, for example, a 10 gigabyte per second optics and/or 100 gigabyte per second optics.

Figure 6A:
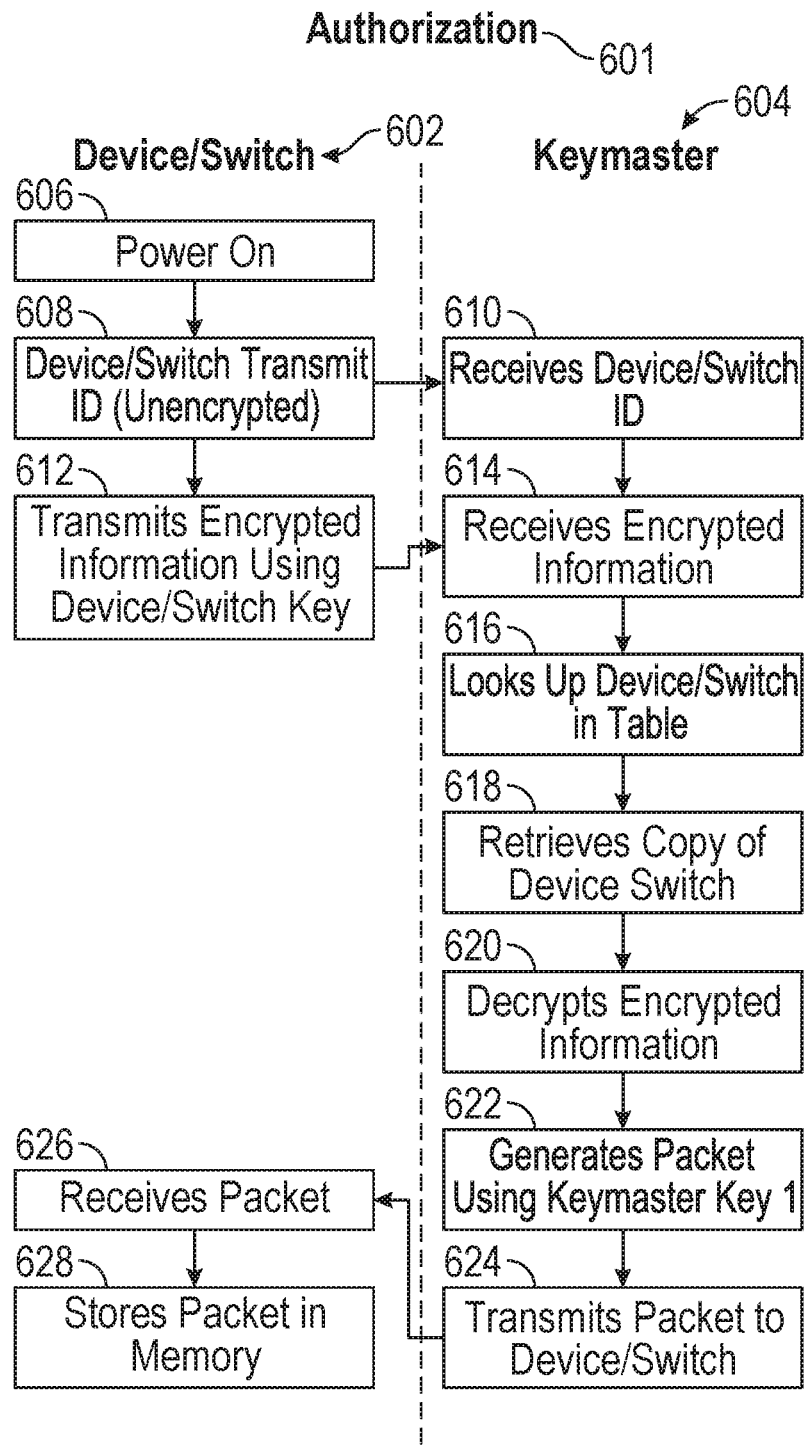
FIG. 6A shows a flow chart illustrating example procedures and operations that may be performed by one or more devices described in connection with the disclosed systems, methods, and apparatus, in accordance with various embodiments of the disclosure.

FIG. 6, shows a diagram 600 that represents an example operational flow of an authorization process associated with the one or more devices described herein, in accordance with one or more example embodiments of the disclosure. In one embodiment, diagram 600 can represent a public and/or a private key encryption mechanism (for example, a Kerberos encryption mechanism) and/or a combination of encryption mechanisms for use in association with the device and the physical modules stored therein.

In one embodiment, one or more keys, such as one or more private and/or public keys for use in encryption, can be centralized in the device such as a network device or can be decentralized at a head-end, or stored higher in various layers of the network. In an embodiment, the keys or a portion of the keys can be updated periodically such as once every hour, every day, every month and/or every year. In an embodiment, such updating may provide a level of security against theft of the one or more physical modules (such as optical modules), or a switch. In an embodiment, a lack of matching of the various keys to one another upon a test can render the devices such as a network device inoperable and/or may render one or more pluggable optics, a group of such pluggable optics or an entire PCB board or switch comprising one or more pluggable optics and/or physical modules inoperable. In one embodiment, such a lack of matching keys can further trigger one or more actions, such as setting one or more alarms, alerting a network administrator, calling the police, configuring a camera to take a picture of a scene, for example, a scene including a perpetrator committing theft of one or more physical modules or the switch itself, and/or configuring a module to begin recording audio of the scene, for example, of a thief as he steals one or more physical modules, for use in criminal prosecution.

In one embodiment, the diagram 600 can include an authorization 601 mechanism to be described further below. In an embodiment, the authorization 601 can comprise processed steps that determine whether a given device 602, for example, a physical module (a switch comprising several physical modules) is authorized to communicate with a switch (a given physical module). In another embodiment, the authorization 601 can determine the device 602, for example, a physical module (a switch comprising several physical modules) is not an imposter, for example, one that has been purchased on the black market. In one embodiment, the device 602 can include a pluggable physical module, an optics module, a pluggable optics module, a pluggable electrical network device and/or any other subcomponent of a switch, for example, a network switch and/or an Ethernet switch.

In one embodiment, the keymaster 604 can include multiple keys for multiple physical modules and/or device 602. In one embodiment, the keymaster 604 can be implemented anywhere on the network such as, for example, the network switch itself and/or higher up in the network such as at a headend, a remote PHY device, a remote MAC device and/or remote hybrid PHY/MAC device.

At block 606, the device 602 can power on. In an embodiment, the device 602 can power on automatically such as, for example, a hot pluggable device. In one embodiment, the user may have to switch on the device manually. In another embodiment, the device may be partially powered on but not fully powered on, that is, powered on to execute one or more processes associated with the authorization 601. In one embodiment, the device may update a counter associated with the number of times that the device is powered on. In one embodiment, if the number of times the device is powered on, using the counter, exceeds the threshold number of times the device may automatically be disabled. In another embodiment, if the threshold number of times the device is powered on exceeds a certain threshold, the device may report such information related to this to the network, for example, to a headend device on the network.

In one embodiment, the device and/or the switch can transmit its ID in an unencrypted format 608 to the keymaster 604. In one embodiment, the device may have had the ID preprogrammed on its onboard memory to the device. In another embodiment, the switch may have had its ID preprogrammed into a memory associated with the switch. In one embodiment, the transmission of the ID in unencrypted format may be performed using a given network protocol, for example, using an Ethernet protocol. In one embodiment, the device and/or switch can transmit its ID automatically multiple times until it receives an indication from the keymaster 604 that the ID has been received.

At block 610, the keymaster 604 can receive the device and/or switch ID. In another embodiment, the keymaster 604 can store the received device and/or switch ID in memory. In one embodiment, the keymaster 604 can transmit a message to the device 602 and/or switch 602 that the keymaster 604 received the device and/or switch ID.

At block 612, the device 602 and/or the switch 602 can transmit encrypted information to the keymaster 604 using a device and/or switch key. In one embodiment, the device and/or switch key can be a private key. In another embodiment, the device and/or switch key can be a public key. In one embodiment, the encrypted information that is transmitted by the device and/or switch using the device and/or switch key can include a predetermined information stored in memory. In one embodiment, the encrypted information can be encrypted using the device and/or switch key using any number of encryption protocols, for example, an Rivest-Shamir-Adleman (RSA) protocol.

At block 614, the keymaster 604 can receive the encrypted information. In one embodiment, the keymaster 604 can store the received encrypted information in memory, for example, in onboard memory, for example, onboard memory on the device (such as a headend device), or may store the received encrypted information elsewhere in the network. In one embodiment, the keymaster 604 can send a confirmation receipt to the device 604 and/or the switch 602 indicative of the reception of the encrypted information using the device and/or switch key.

At block 616, the keymaster 604 can look up a device and/or switch ID in a table associated with the keymaster. In an embodiment, the table can be included in memory associated with the keymaster. In an embodiment, the table can include the device and/or switch ids for multiple devices and/or switches on the network.

At block 618, the keymaster 604 can retrieve a copy of a device and/or switch key, for example, from an entry in the table. In one embodiment, the retrieval of the copy of the device and/or switch key can be performed using a processor from memory on the keymaster device. In one embodiment, the copy of the device and/or switch key can include a copy of a public key, and/or can include a copy of a private key associated with the device and/or switch.

At block 620, the keymaster 604 can decrypt the received encrypted information from the device and/or switch 602. In an embodiment, the keymaster can decrypt the encrypted information using one or more encryption protocols such as and RSA protocol. In one embodiment, if the keymaster 604 is unable to decrypt the encrypted information using the retrieved copy of the device and/or switch key, the keymaster can determine that the device 602 and/or the switch 602 is not an authorized device and/or switch and may determine to disable further communications with the device and/or switch 602.

At block 622, the keymaster 604 can generate at packet, such as a data packet, using a first keymaster key (further referred to herein as keymaster key 1). In an embodiment, the generated packet, using the keymaster key 1, can be encrypted using any encryption protocol such as RSA encryption. In an embodiment, the packet generated using the keymaster key 1 can be stored in the keymaster memory. In another embodiment, the generated packet using the keymaster key 1 can be stored anywhere in the network such as at one or more network devices such as the headend device.

At block 624, the keymaster 604 can transmit the generated packet to the device and/or switch. In an embodiment, the generated packet can be generated using the keymaster key 1. In an embodiment, the generated packet transmitted by the keymaster 604 to the device and/or switch can serve as a packet for use in an authentication scheme such as authentication scheme 603 to be described below in connection with FIG. 6B.

At block 626, the device 602 and/or the switch 602 can receive the packet from the keymaster 604 that was transmitted at block 624. In an embodiment, the device 602 and/or the switch 602 can transmit a acknowledgement message back to the keymaster 604 indicative of the receipt of the packet at block 626.

At block 628, the device 602 and/or the network switch 602 can store the packet in memory, for example, at an onboard memory associated with the device 602 and/or the switch 602. In an embodiment, the device 602 and/or the switch 602 can further use this packet or an authentication protocol mechanism for communication with one or more devices on the network such as other network switches and/or other headend devices.

Figure 6B:
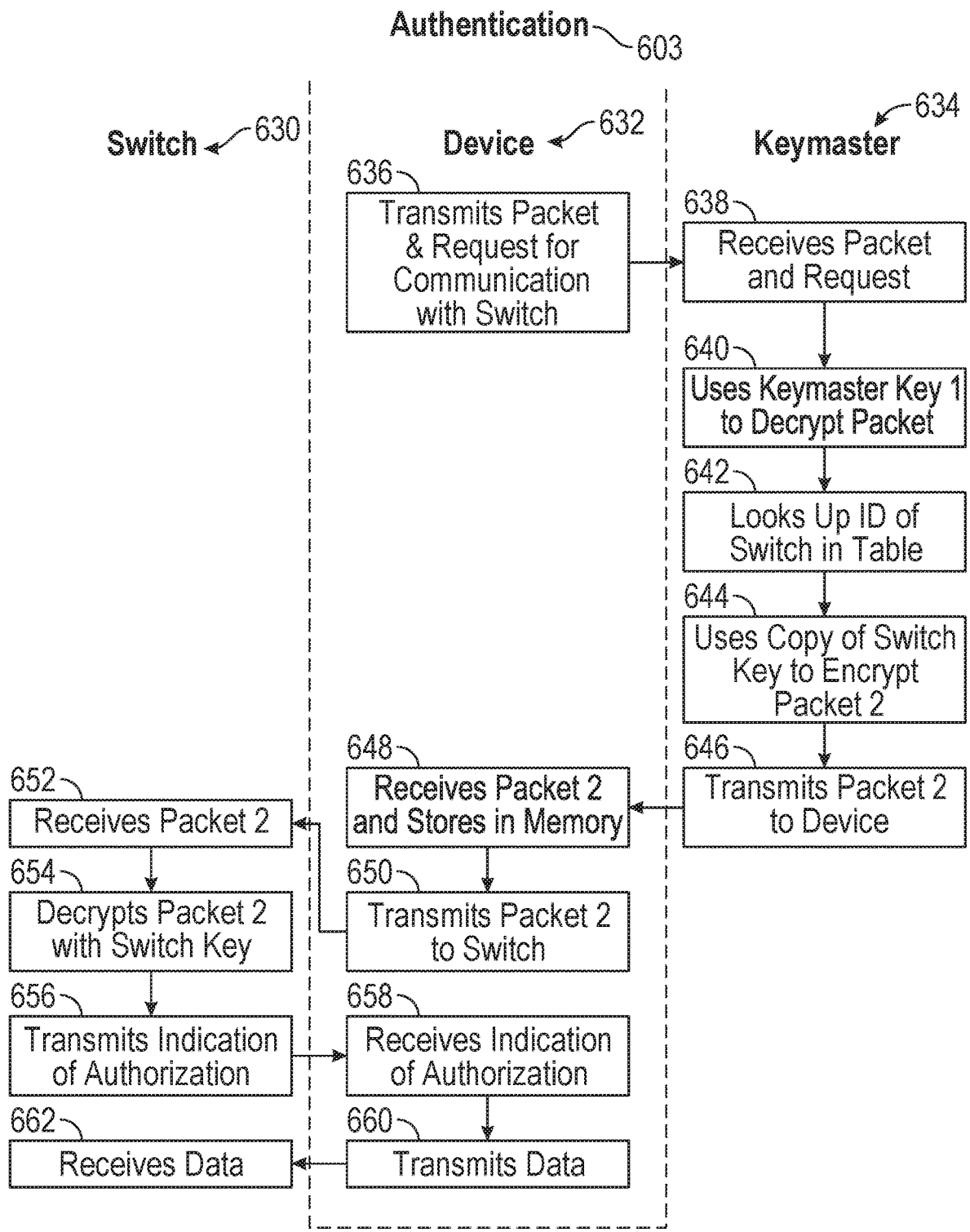
FIG. 6B shows another flow chart illustrating other example procedures and operations that may be performed by one or more devices described in connection with the disclosed systems, methods, and apparatus, in accordance with various embodiments of the disclosure.

FIG. 6B shows an authentication 603 mechanism associated with the switch 630, the device 632 and/or the keymaster 634, in accordance with example embodiments of the disclosure. In an embodiment, the switch 630 can include a network switch such as an Ethernet switch. In an embodiment, the switch 630 can house one or more devices 632. In one embodiment, the device 632 can include a physical module, an optical module, an electrical module and the like. In one embodiment, the device 632 can include an SPF module. In an embodiment, device 632 can include devices that are authorized to communicate with the keymaster, for example, having underwent the process of authorization 601 shown and described in connection with FIG. 6A above. In one embodiment, the keymaster 634 can include devices that are stored on or that are located, for example, at a headend and/or elsewhere in the network.

At block 636, the device 632 can transmit a packet and a request for communication with the switch 630 to the keymaster 634. In an embodiment, the packet transmitted at block 636 by the device 632 can be an encrypted packet encrypted with a device key. In one embodiment, the device key can include a private key and/or a public key. In one embodiment, the request transmitted by the device 632 at block 636 for communication with the switch 630 may not be encrypted but rather may just include a series of messages, for example, one or more messages transmitted in association with a given network protocol, for example an Ethernet protocol. In one embodiment, the device 632 can transmit the packet and the request at block 636 multiple times until it receives an indication from the keymaster 634 of receipt by the keymaster of the packet and the request.

At block 638, the keymaster 634 receives the packet and the request transmitted by the device 632 at block 636. In an embodiment, the keymaster 634 can store a portion of the packet and/or the request in memory, for example, at an onboard memory or at a memory electrically connected to the keymaster 634. In an embodiment, the keymaster 634 can send a confirmation information to the device 632 indicative of the receipt of the packet and the request. In another embodiment, the keymaster 634 can transmit back to the device an indication of lack of receipt of either the packet and/or the request to the device 632 and solicit the renewed transmission of the request and/or the packet by the device 632 to the keymaster 634.

At block 640, the keymaster 634 can use the keymaster key 1 to decrypt the packet received at block 638. In one embodiment, the keymaster key 1 can have stored memory in the keymaster 634 and can have been previously used in association with FIG. 6A for authorization at block 622 of FIG. 6A. In an embodiment, the keymaster 634 can use any decryption protocol to decrypt the packet at block 640. In an embodiment, if at block 640 the keymaster 634 is unable to use the keymaster key 1 to decrypt the packet received at block 638 from the device 632 then the keymaster 634 can disable further communication with device 632, that is the device 632 may be refused authentication. In another embodiment, the keymaster 634 may send an indication to another device on the network to refuse authentication to the device, that is, the keymaster 634 does not necessarily have to perform the processes to refuse authentication to the device itself.

At block 642, the keymaster 634 can look up the ID of a switch 630 associated with the device 632 in a table. In another embodiment, the switch may have been indicated in the request transmitted at block 636 by the device. In one embodiment, the table can be stored in memory at the keymaster or in memory associated with the keymaster 634. In an embodiment, the looking up of the ID of the switch may be performed using standard data base search inquiries.

In one embodiment, at block 644, the keymaster 634 can use a copy of the switch key to encrypt a second data packet, packet 2. In an embodiment, the keymaster 634 can have stored the copy of the switch key in memory associated with the keymaster or onboard a device associated with the keymaster 634. In an embodiment, the keymaster 634 can encrypt the second packet using the switch using any given encryption protocol. In an embodiment, the switch key can include a private and/or a public key. In an embodiment, the encrypted second packet, packet 2, can be stored in memory associated with the keymaster 634.

At block 646, the keymaster 634 can transmit the second packet, packet 2, to the device 632. In an embodiment, the keymaster 634 can continue to transmit copies of packet 2 to the device 632 until the keymaster 634 receives a confirmation message from the device 632 of the receipt of packet 2. In an embodiment, packet 2 can represent an encrypted packet using the switch key that can be used to authenticate device 632 with the switch 630 as further described below.

At block 648, the device 632 can receive packet 2, the second packet, and can store the second packet in memory. In an embodiment, the storage of packet 2 in memory by the device 632 can be performed on onboard memory associated with the device and/or off-board memory, for example, memory associated with one or more devices at a switch 630. In an embodiment, the device 632 can transmit a confirmation packet back to the keymaster 634 upon the receipt of the second packet and/or its storage in memory.

At block 650, the device 632 can transmit the second packet to the switch 630. In an embodiment, the transmission of the second packet to the switch 630 can be done in association with one or more protocols such as an Ethernet protocol. In an embodiment, the device 632 can continue to transmit the second packet to the switch 630 until it receives an indication of receipt by the switch 630 of the second packet from the device 632.

At block 652, the switch can receive the second packet from the device 632. In an embodiment, the switch 630 can store at least a portion of the second packet in memory associated with the switch. In an embodiment, the memory may be onboard to the switch and/or off-board elsewhere in the network. In an embodiment, the switch 630 can transmit an indication of the receipt of the second packet back to the device 632.

At block 654, the switch 630 can decrypt the second packet, packet 2, using its switch key. In an embodiment, the switch key may have previously been programmed to be stored on memory associated with and/or communicable with the switch 630. In an embodiment, if the switch is unable to decrypt the second packet using the switch key at block 654 then the switch 630 can prevent further communication of the switch 630 with the device 632. Additionally or alternatively, the switch 630 upon not being able to decrypt the second packet using the switch key may send an indication to the keymaster 634 and/or any other device on the network of the failure of the device 632 to be authenticated with the switch 630. In an embodiment, the switch can also communicate to the device 632 that the device lacks authentication to communicate with the switch 630 and/or other devices on the network.

At block 656, upon the successful decryption of the second packet, using the switch key by the switch 630, the switch 630 can transmit an indication of authorization to the device 632 for communication with the switch 630. In an embodiment, the switch 630 can further transmit an indication of the authorization to communicate with the device 632 to the keymaster 634 and/or other devices on the network. In an embodiment, the indication of authorization transmitted by the switch 630 to the device 632 can include one or more authorization frames such as one or more Ethernet frames or data frames, generally, to be transmitted to the device. In an embodiment, the switch 630 can continue to transmit these indications of authorization at block 656 until it receives an indication from the device 632 and/or other devices on the network as the case may be of the receipt of the indication of authorization by the switch 630.

At block 658, the device 632 can receive the indication of authorization transmitted by the switch 630 at block 656. In an embodiment, the device 632 can store this indication of authorization message in memory associated with the device, for example, onboard memory to device and/or off-board memory communicably linked to the device 632. In an embodiment, the device 632 can transmit an indication of receipt of the authorization back to the switch 630.

At block 660, the device 632 can transmit data to the switch 630. In an embodiment, the transmission of data at block 660 to the switch 630 by the device 632 can include content data such as cable content and/or modulated data and the like. In an embodiment, the data transmitted by the device 632 may be encrypted or may unencrypted. In an embodiment, the device 632 can transmit this data in upstream or downstream fashion to the switch and/or other devices on the network. In an embodiment, the device 632 can also receive data from the switch 630 and/or other devices on the network.

At block 662, the switch 630 can receive the data transmitted by the device 632 at block 660. In an embodiment, the switch 630 can transmit the data received from the device 632 to one or more devices on the network.

IV. Additional Implementation Details

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an implementation of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

V. Conclusion

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method comprising:

transmitting, by a first device of a system, to a second device of the system, a first packet and a request for communication with a switch, the first packet comprising a first key associated with a first authentication of the first device;

receiving, by the second device, the first packet and the request for communication with the switch;

decrypting, by the second device, the first packet using a second key, the decryption associated with the first authentication;

searching, by the second device, for an identifier associated with the switch;

retrieving, by the second device, a copy of a third key from memory;

generating, by the second device, based on the first authentication, a second packet using the third key;

transmitting, by the second device, the second packet to the first device;

receiving, by the first device, the second packet from the second device, the second packet indicative of the first authentication;

storing, by the first device, the second packet in memory;

transmitting, by the first device, the second packet to the switch, the second packet associated with a second authentication;

receiving, by the first device, indication of the second authentication from the switch; and transmitting, by the first device, data to the switch;

wherein the switch comprises an Ethernet switch and the first device is housed in a chassis associated with the switch.

2. The method of claim 1, further comprising transmitting, by the first device, a second identifier to the second device, wherein the second identifier comprises an identifier of an optical module.

3. The method of claim 1, wherein transmitting the data to the switch comprises transmitting content for one or more devices.

4. The method of claim 1, wherein transmitting the request for communication with the switch to the second device comprises transmitting unencrypted information to the second device.

5. At least one non-transitory computer-readable medium storing computer-executable instructions which when executed by one or more processors result in performing operations comprising:

transmitting, by a first device of a system, to a second device of the system, a first packet and a request for communication with a switch, the first packet comprising a first key associated with a first authentication of the first device;

receiving, by the second device, the first packet and the request for communication with the switch;

decrypting, by the second device, the first packet using a second key, the decryption associated with the first authentication;

searching, by the second device, for an identifier associated with the switch;

retrieving, by the second device, a copy of a third key from memory;

generating, by the second device, based on the first authentication, a second packet using the third key;

transmitting, by the second device, the second packet to the first device;

receiving, by the first device, the second packet from the second device, the second packet indicative of the first authentication;

storing, by the first device, the second packet in memory;

transmitting, by the first device, the second packet to the switch, the second packet associated with a second authentication;

receiving, by the first device, indication of the second authentication from the switch; and transmitting, by the first device, data to the switch;

wherein the switch comprises an Ethernet switch and the first device is housed in a chassis associated with the switch.

6. The at least one non-transitory computer-readable medium of claim 5, wherein the first device includes a pluggable optical module.

7. The at least one non-transitory computer-readable medium of claim 6, wherein the pluggable optical module comprises an optical module having a 10 gigabit Ethernet or a 100 gigabit Ethernet functionality.

8. The at least one non-transitory computer-readable medium of claim 5, wherein the second device comprises a keymaster device.

9. The at least one non-transitory computer-readable medium of claim 5, wherein the second device comprises a portion of a remote physical (PHY) device, a remote Medium Access Control (MAC) device, or a headend device.

10. A system comprising:

a first device comprising a physical module that includes a first processor and first memory comprising a first non-transitory computer-readable medium; and a second device comprising a second processor and second memory comprising a second non-transitory computer-readable medium;

wherein the first device is configured to:

transmit, to the second device, a first packet and a request for communication with a third device, the first packet comprising a first key associated with a first authentication of the first device;

receive a second packet from the second device, the second packet indicative of the first authentication;

store the second packet in memory;

transmit the second packet to the third device, the second packet associated with a second authentication of the first device;

receive an indication of the second authentication from the third device;

transmit data to the third device;

wherein the second device is further configured to:

receive the first packet and the request for communication with the third device by the first device;

decrypt the first packet using a second device key, the decryption associated with the first authentication;

search for an identifier associated with the third device in a table;

retrieve a copy of a third device key from memory;

generate, based on the first authentication, the second packet using the copy of the third device key; and transmit the second packet to the first device;

wherein the third device comprises an Ethernet switch and the first device is housed in a chassis associated with the third device.

11. The system of claim 10 wherein the third device is further configured to:
- receive the second packet from the first device;
- decrypt the second packet using the third device key, the decryption of the second packet associated with the second authentication;
- transmit the indication of the second authentication to the first device; and
- receive the data from the first device.

12. The system of claim 10, wherein the physical module includes a pluggable optical module.

13. The system of claim 12, wherein the pluggable optical module comprises an optical module having a 10 gigabit Ethernet or a 100 gigabit Ethernet functionality.

14. The system of claim 10, wherein the second device is a keymaster device.

15. The system of claim 10, wherein the second device is a portion of a remote physical (PHY) device, a remote Medium Access Control (MAC) device, or a headend device.

16. The system of claim 10, wherein the first device being configured to transmit the data to the third device is associated with the third device transmitting content for one or more additional devices.

17. The system of claim 10, wherein the first device being configured to transmit the request for communication with the third device comprises the first device transmitting unencrypted information to the second device.

18. The system of claim 10, wherein the third device is further configured to be mounted to a utility pole.

* * * * *